US012749741B2

(12) United States Patent
Kim

(10) Patent No.: US 12,749,741 B2
(45) Date of Patent: Sep. 29, 2026

(54) CYLINDRICAL SECONDARY BATTERY INCLUDING A CAP ASSEMBLY WITH AN INTERCONNECTION AREA

(71) Applicant: Samsung SDI Co., Ltd., Yongin-si (KR)

(72) Inventor: Dae Kyu Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 594 days.

(21) Appl. No.: 18/245,875

(22) PCT Filed: Jun. 29, 2021

(86) PCT No.: PCT/KR2021/008186
§ 371 (c)(1),
(2) Date: Mar. 17, 2023

(87) PCT Pub. No.: WO2022/065637
PCT Pub. Date: Mar. 31, 2022

(65) Prior Publication Data

US 2023/0361392 A1 Nov. 9, 2023

(30) Foreign Application Priority Data

Sep. 25, 2020 (KR) ........................ 10-2020-0124929

(51) Int. Cl.
*H01M 50/107* (2021.01)
*H01M 50/152* (2021.01)
*H01M 50/308* (2021.01)

(52) U.S. Cl.
CPC ....... *H01M 50/107* (2021.01); *H01M 50/152* (2021.01); *H01M 50/308* (2021.01)

(58) Field of Classification Search
CPC . H01M 50/107; H01M 50/152; H01M 50/308
See application file for complete search history.

(56) References Cited

U.S. PATENT DOCUMENTS 9,564,617 B2 2/2017 Byun
2012/0282504 A1 11/2012 Kim et al.
(Continued)

FOREIGN PATENT DOCUMENTS

CN 104112839 A 10/2014
CN 115298892 A 11/2022
(Continued)

OTHER PUBLICATIONS

JP 2005149862 English Translation (Year: 2005).*
(Continued)

*Primary Examiner* — Jimmy Vo
(74) *Attorney, Agent, or Firm* — Womble Bond Dickinson (US) LLP

(57) ABSTRACT

A technical problem to be solved according to an embodiment of the present invention is to provide a cylindrical secondary battery which can prevent components thereof from being deformed during manufacturing processes or in use. To this end, an embodiment of the present invention provides a cylindrical secondary battery comprising: a cylindrical can; an electrode assembly received in the cylindrical can; and a cap assembly covering the cylindrical can to seal the electrode assembly, wherein the cap assembly comprises a cap-up, a cap-down below the cap-up, and a safety vent between the cap-up and the cap-down, and the contact ratio between the safety vent and the cap-down ranges from 60% to 100%.

8 Claims, 6 Drawing Sheets

(56) References Cited

U.S. PATENT DOCUMENTS

| | | | |
|---|---|---|---|
| 2013/0216870 | A1 | 8/2013 | Kim et al. |
| 2014/0315058 | A1 | 10/2014 | Byun |
| 2023/0140593 | A1 | 5/2023 | Kim et al. |

FOREIGN PATENT DOCUMENTS

| | | | | | |
|---|---|---|---|---|---|
| EP | 4 123 814 | A1 | | 1/2023 | |
| JP | H9-134715 | A | | 5/1997 | |
| JP | 09-199105 | A | | 7/1997 | |
| JP | 2004-55372 | A | | 2/2004 | |
| JP | 2004-158303 | A | | 6/2004 | |
| JP | 2005149862 | A | * | 6/2005 | |
| KR | 10-2011-0105953 | A | | 9/2011 | |
| KR | 20120063264 | A | * | 6/2012 | ........ H01M 10/0422 |
| KR | 10-1310015 | B1 | | 9/2013 | |
| KR | 10-2012-0063264 | A | | 6/2015 | |
| KR | 10-1678735 | B1 | | 11/2016 | |
| KR | 10-2018-0000115 | A | | 1/2018 | |
| KR | 10-2019-0012799 | A | | 2/2019 | |
| KR | 10-2019-0049205 | A | | 5/2019 | |

OTHER PUBLICATIONS

KR 20120063264 English Translation (Year: 2012).*

International Search Report of PCT/KR2021/008186, Oct. 6, 2021, 4 pp.

Extended European Search Report issued in corresponding EP Application No. 21872674.3, dated May 16, 2025, 11 pages.

Chinese Office Action corresponding to CN Application No. 202180064937.3, dated Aug. 15, 2025 (10 pages).

* cited by examiner

[FIG. 1a]
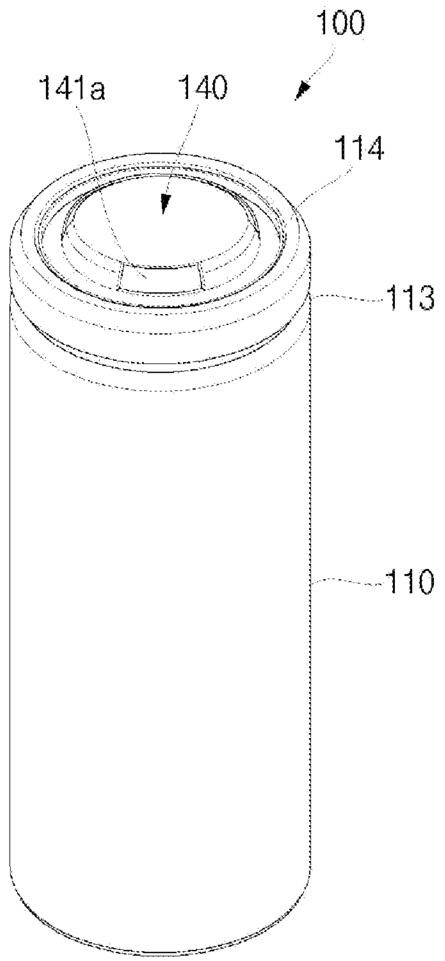

[FIG. 1b]
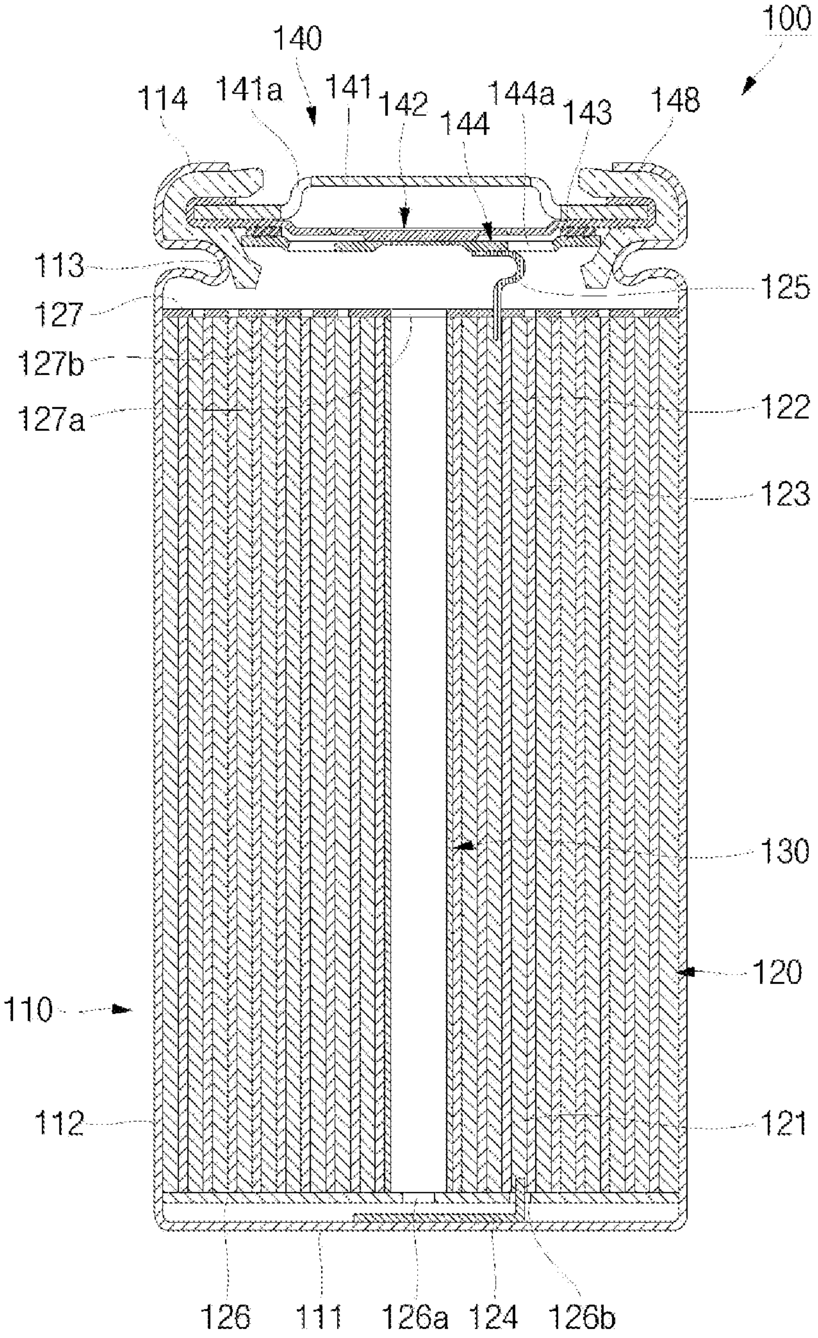

[FIG. 1c]
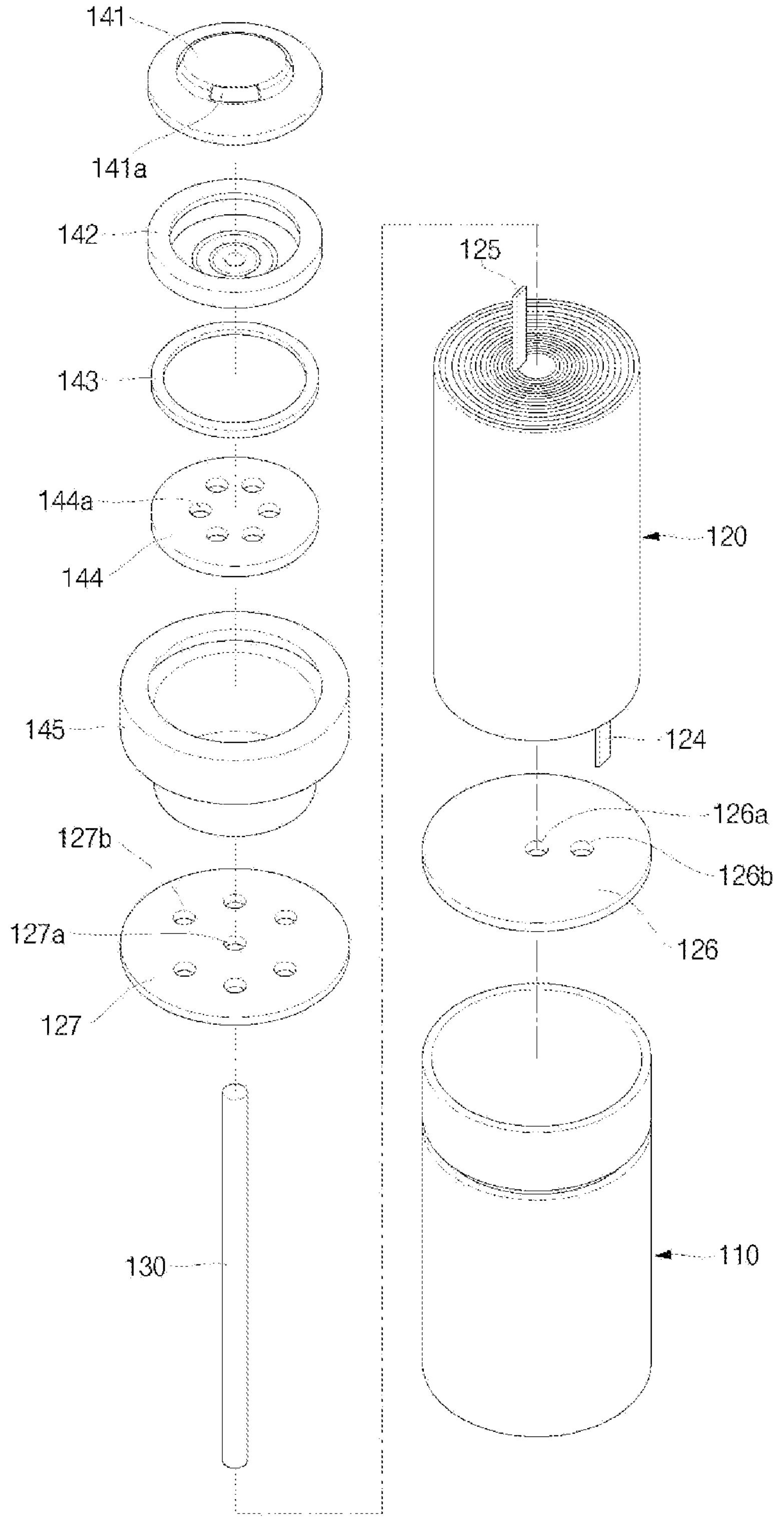

[FIG. 2a]
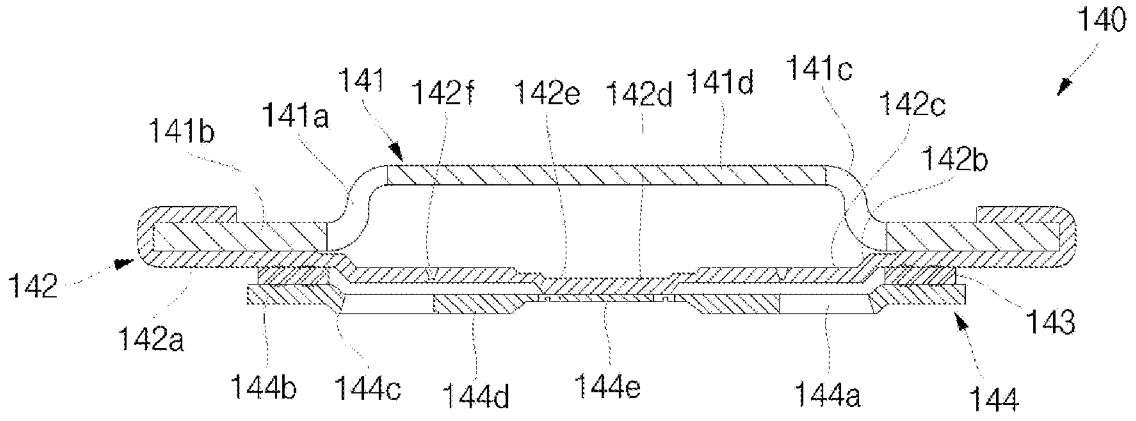
[FIG. 2b]
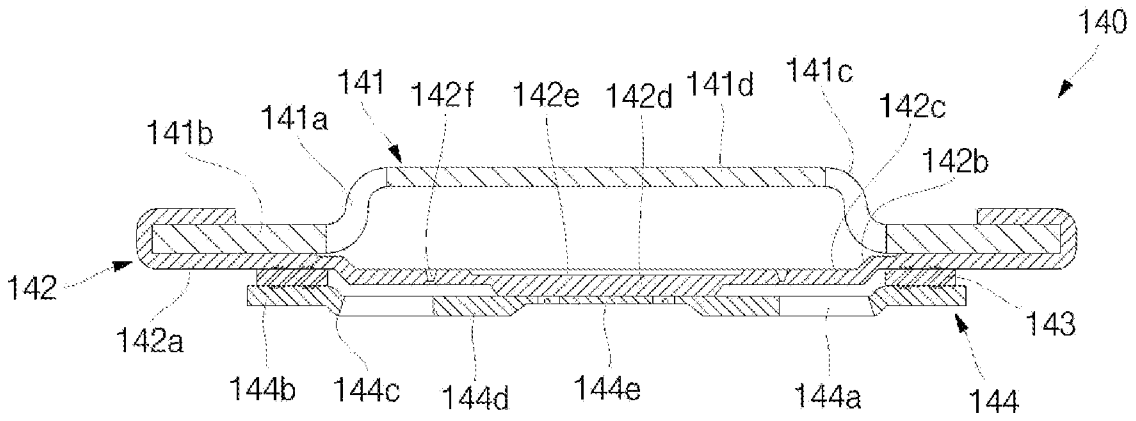

[FIG. 2c]
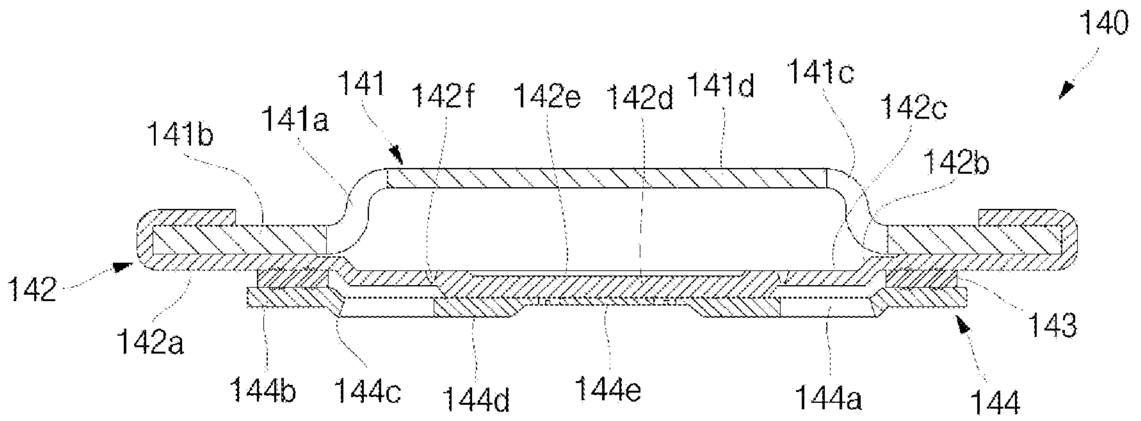
[FIG. 2d]
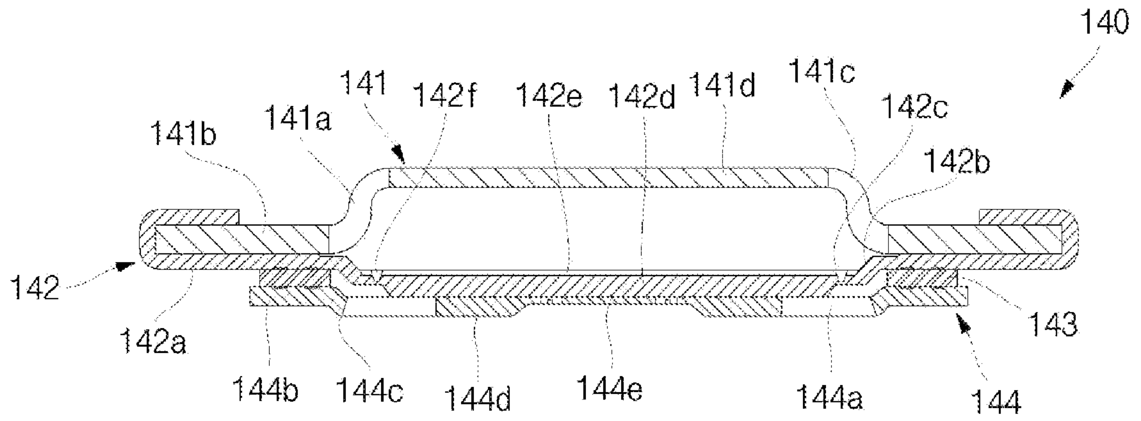

[FIG. 3]

| | Vent bottom part length (mm) | Contact length (mm) | Usage amount (%) | Presence or absence of deformation | – |
|---|---|---|---|---|---|
| 1 | 11.04 | 3.28 | 29.7 | Deformation | Comparative Example 1 |
| 2 | 11.04 | 4.5 | 40.8 | Deformation | Comparative Example 2 |
| 3 | 11.04 | 5.5 | 49.8 | Deformation | Comparative Example 3 |
| 4 | 11.04 | 6.0 | 54.3 | Deformation | Comparative Example 4 |
| 5 | 11.04 | 6.5 | 58.9 | Deformation | Comparative Example 5 |
| 6 | 11.04 | 7.0 | 63.4 | No deformation | Embodiment 1 |
| 7 | 11.04 | 7.5 | 67.9 | No deformation | Embodiment 2 |
| 8 | 11.04 | 9.6 | 87.0 | No deformation | Embodiment 3 |
| 9 | 11.04 | 11.04 | 100.0 | No deformation | Embodiment 4 |

CYLINDRICAL SECONDARY BATTERY INCLUDING A CAP ASSEMBLY WITH AN INTERCONNECTION AREA

CROSS-REFERENCE TO RELATED APPLICATIONS

This application is a U.S. National Phase Patent Application of International Application Number PCT/KR2021/008186, filed on Jun. 29, 2021, which claims priority of Korean Patent Application Number 10-2020-0124929, filed on Sep. 25, 2020, the entire content of each of which is incorporated herein by reference.

TECHNICAL FIELD

An embodiment of the present invention relates to a cylindrical secondary battery.

BACKGROUND ART

In general, a cylindrical secondary battery includes a cylindrical electrode assembly, a cylindrical can accommodating the electrode assembly and an electrolyte, and a cap assembly coupled to an upper opening of the can to seal the can and allowing current generated in the electrode assembly to flow to an external device.

In order to prevent the electrode assembly and the cap assembly from moving, a beading part and a crimping part are formed by applying a pressure along an upper outer circumferential surface of the can. Here, since the pressure is applied inward from the outside to the can, deformation of the cap assembly is likely to occur. Particularly, when the cap assembly is deformed, sealing force of the secondary battery is lowered, and an overall height of the secondary battery is also changed.

The above-described information disclosed in the technology that serves as the background of the present invention is only for improving understanding of the background of the present invention and thus may include information that does not constitute the related art.

DISCLOSURE OF THE INVENTION

Technical Problem

An embodiment of the present invention provides a cylindrical secondary battery capable of preventing component deformation during a manufacturing process or during use.

Technical Solution

A cylindrical secondary battery according to an embodiment of the present invention includes: a cylindrical can; an electrode assembly accommodated in the cylindrical can; and a cap assembly configured to cover the cylindrical can so as to seal the electrode assembly, wherein the cap assembly includes a cap-up, a cap-down below the cap-up, and a safety vent between the cap-up and the cap-down, wherein a mutual contact ratio between safety vent and the cap-down may range from 60% to 100%.

The safety vent may include: a vent contact part that is in contact with the cap-up; a vent inclined part inclined downward from the vent contact part; a vent bottom part extending in parallel from the vent inclined part; and a vent protrusion protruding from the vent bottom part so as to be in contact with the cap-down.

A diameter of the vent protrusion may be 60% to 100% of a diameter of the vent bottom part.

The vent bottom part may further include a flat vent groove part formed in a top surface thereof facing the vent protrusion.

The cap-down may include a cap-down through-hole passing through the cap-down, and the vent protrusion may cover a portion of the cap-down through-hole.

The vent protrusion may be welded to the cap-down.

The vent bottom part may further include a line-shaped vent groove part formed in a top surface thereof facing the vent protrusion.

The cap-down may further include a flat cap-down groove part formed in a bottom surface thereof, and a diameter of the vent protrusion may be greater than a diameter of the flat cap-down groove part.

Advantageous Effects

The embodiment of the present invention may provide the cylindrical secondary battery capable of preventing the component deformation during the manufacturing process or during the use. In some examples, the interconnection area between the safety vent and the cap-down is approximately 40% to approximately 100% of the area of the bottom part of the safety vent to prevent the deformation of the components such as the cap assembly during the manufacturing process or during the use, thereby providing the secondary battery, in which the sealing performance is not deteriorated, and the overall height thereof is not changed.

BRIEF DESCRIPTION OF THE DRAWINGS

FIGS. 1*a*, 1*b*, and 1*c* are perspective, cross-sectional, and exploded perspective views of a cylindrical secondary battery according to an embodiment of the present invention.

FIGS. 2*a* to 2*d* are cross-sectional view illustrating a cap assembly of a cylindrical secondary battery according to Comparative Example and Embodiment of the present invention.

FIG. 3 is a table summarizing whether the cap assembly of the cylindrical secondary battery is deformed according to Embodiment and Comparative Example of the present invention.

MODE FOR CARRYING OUT THE INVENTION

The present invention may, however, be embodied in many different forms and should not be construed as being limited to the embodiments set forth herein; rather, these embodiments are provided so that those skilled in the art thoroughly understand the present invention. Rather, these embodiments are provided so that this disclosure will be thorough and complete, and will fully convey the scope of the present invention to those skilled in the art.

In addition, in the following drawings, the thickness or size of each layer is exaggerated for convenience and clarity of description, and the same reference numerals in the drawings refer to the same elements. As used herein, the term "and/or" includes any and all combinations of one or more of the associated listed items. In this specification, it will also be understood that when a member A is referred to as being connected to a member B, the member A can be directly connected to the member B or indirectly connected to the member B with a member B therebetween.

The terms used herein are for illustrative purposes of the present invention only and should not be construed to limit the meaning or the scope of the present invention. As used in this specification, a singular form may, unless definitely indicating a particular case in terms of the context, include a plural form. Also, the expressions "comprise/include" and/or "comprising/including" used in this specification neither define the mentioned shapes, numbers, steps, operations, members, elements, and/or groups of these, nor exclude the presence or addition of one or more other different shapes, numbers, steps, operations, members, elements, and/or groups of these, or addition of these. The term "and/or" used herein includes any and all combinations of one or more of the associated listed items.

As used herein, terms such as "first," "second," etc. are used to describe various members, components, areas, layers, and/or portions. However, it is obvious that the members, components, areas, layers, and/or portions should not be defined by these terms. The terms do not mean a particular order, up and down, or superiority, and are used only for distinguishing one member, component, area, layer, or portion from another member, component, area, layer, or portion. Thus, a first member, component, area, layer, or portion which will be described may also refer to a second member, component, area, layer, or portion, without departing from the teaching of the present invention.

Spatially relative terms, such as "below", "beneath", "lower", "above", "upper" and the like, may be used herein for ease of description to describe one element or feature's relationship to another element(s) or feature(s) as illustrated in the figures. These spatially relative terms are intended for easy comprehension of the prevent invention according to various process states or usage states of the prevent invention, and thus, the present invention is not limited thereto. For example, an element or feature shown in the drawings is turned inside out, the element or feature described as "beneath" or "below" may change into "above" or "upper". Thus, the term "lower" may encompass the term "upper" or "below".

FIGS. 1*a*, 1*b*, and 1*c* are perspective, cross-sectional, and exploded perspective views of a cylindrical secondary battery 100 according to an embodiment of the present invention.

Referring to FIGS. 1*a*, 1*b*, and 1*c*, the secondary battery 100 according to the present invention includes a cylindrical can 110, an electrode assembly 120, and a cap assembly 140. In some examples, a center pin 130 coupled to the electrode assembly 120 may be further provided.

The cylindrical can 110 may include a circular bottom part 111 and a cylindrical side part 112 extending by a predetermined length upward from the bottom part 111. During a process of manufacturing the secondary battery, an upper portion of the cylindrical can 110 is opened. Thus, during the process of assembling the secondary battery, the electrode assembly 120 may be inserted into the cylindrical can 110 together with an electrolyte. In some examples, the cylindrical can 110 may include steel, steel alloy, aluminum, an aluminum alloy, or an equivalent thereof. In some examples, in the cylindrical can 110, a beading part 113 recessed inward may be formed at a lower portion of the cylindrical can 110 with respect to the cap assembly 140 to prevent the electrode assembly 120 and the cap assembly 140 from being separated to the outside, and a crimping part 114 bent inward may be formed at an upper portion of the cylindrical can 110 with respect to the cap assembly 140.

The electrode assembly 120 may be accommodated inside the cylindrical can 110. The electrode assembly 120 may include a negative electrode plate 121 coated with a negative electrode active material (e.g., graphite, carbon, etc.), a positive electrode plate 122 coated with a positive electrode active material (e.g., transition metal oxide ($LiCoO_2$, $LiNiO_2$, $LiMn_2O_4$, etc.)), and a separator 123 disposed between the negative electrode plate 121 and the positive electrode plate 122 to prevent short circuit from occurring and allowing lithium ions to move only. In some examples, the negative electrode plate 121, the positive electrode plate 122, and the separator 123 may be wound in a substantially cylindrical shape. In some examples, the negative plate 121 may include copper (Cu) or nickel (Ni) foil, the positive plate 122 may include aluminum (Al) foil, and the separator 123 may include polyethylene (PE) or polypropylene (PP). In some examples, in the negative electrode plate 121, a negative electrode tab 124 protruding downward by a predetermined length may be welded to a positive electrode tab 125 protruding upward by a predetermined length, but vice versa. In some examples, the negative electrode tab 124 may include a copper or nickel material, and the positive electrode tab 125 may include an aluminum material.

In some examples, the negative electrode tab 124 of the electrode assembly 120 may be welded to the bottom part 111 of the cylindrical can 110. Thus, the cylindrical can 110 may act as a negative electrode. Of course, on the contrary, the positive electrode tab 125 may be welded to the bottom part 111 of the cylindrical can 110, and in this case, the cylindrical can 110 may operate as the positive electrode.

In some examples, a first insulating plate 126 coupled to the cylindrical can 110 and having a first hole 126*a* at a center thereof and a second hole 126*b* formed at the outside thereof may be interposed between the electrode assembly 120 and the bottom part 111. The first insulating plate 126 may serve to prevent the electrode assembly 120 from being in electrical contact with the bottom part 111 of the cylindrical can 110. In some examples, the first insulating plate 126 may serve to prevent the positive electrode plate 122 of the electrode assembly 120 from being in electrical contact with the bottom part 111. In some examples, the first hole 126*a* may serve to allow a gas to quickly move upward through the center pin 130 when a large amount of gas is generated due to abnormality in the secondary battery, and the second hole 126*b* may serve to allow the negative electrode tab 124 to pass therethrough so as to be welded to the bottom part 111.

In some examples, a second insulating plate 127 coupled to the cylindrical can 110 and having a first hole 127*a* at a center thereof and a plurality of second holes 126*b* formed in the outside thereof may be interposed between the electrode assembly 120 and the bottom portion 140. The second insulating plate 127 may serve to prevent the electrode assembly 120 from being in electrical contact with the cap assembly 140. In some examples, the second insulating plate 127 may serve to prevent the negative electrode plate 121 of the electrode assembly 120 from being in electrical contact with the cap assembly 140. In some examples, the first hole 127*a* may serve to allow a gas to quickly move to the cap assembly 140 when a large amount of gas is generated due to abnormality in the secondary battery, and the second hole 126*b* may serve to allow the positive electrode tab 125 to pass therethrough so as to be welded to the cap assembly 140. In addition, the rest second hole 127*b* may serve to allow the electrolyte to quickly flow into the electrode assembly 120 during a process of injecting the electrolyte.

In some examples, each of the first holes 126*a* and 127*a* of the first and second insulating plates 126 and 127 may have a diameter less than that of the center pin 130 so that the center pin 130 does not in electrical contact with the bottom part 111 of the cylindrical can 110 or the cap assembly 140 by an external impact.

In some examples, the center pin 130 may have a hollow circular pipe shape and may be coupled to the approximately center of the electrode assembly 120. In some examples, the center pin 130 may include steel, a steel alloy, aluminum, an aluminum alloy, or polybutylene terepthalate. The center pin 130 serves to suppress deformation of the electrode assembly 120 during charging and discharging of the battery and serves as a passage for a gas generated inside the secondary battery. In some cases, the center pin 130 may be omitted.

The cap assembly 140 may include a cap-up 141 having a plurality of through-holes 141*a*, a safety vent 142 disposed under the cap-up 141, a connection ring 143 disposed below the safety vent 142, and a cap-down 144 disposed below the safety vent 142 and the connection ring 143, having a plurality of through-holes 144*a*, and electrically connected to the positive electrode tab 125. In some examples, the cap assembly 140 may further include an insulating gasket 145 that insulates the cap-up 141, the safety vent 143, and the cap-down 144 from the side part 111 of the cylindrical can 110.

In some examples, the insulating gasket 145 may be substantially compressed between the beading part 113 and the crimping part 114, which are formed on the side part of the cylindrical can 110. In some examples, the through-holes 141*a* of the cap-up 141 and the through-holes 144*a* of the cap-down 144 may be configured to discharge an internal gas to the outside when an abnormal internal pressure is generated inside the cylindrical can 110. In some examples, the internal gas may reverse the safety vent 143 upward through the through-holes 144*a* of the cap-down 144 so that the safety vent 143 is electrically disconnected from the cap-down 144, and then, as the safety vent 144 is torn, the internal gas may be discharged to the outside through the through-holes 141*a* of the cap-up 141.

In some examples, an electrolyte (not shown in the drawing) may be injected inside the cylindrical can 110 to serve so that lithium ions generated by electrochemical reaction in the negative electrode plate 121 and the positive electrode plate 122 inside the battery during the charging and discharging is movable. The electrolyte may include a non-aqueous organic electrolyte that is a mixture of lithium salt and a high-purity organic solvent. In some examples, the electrolyte may include a polymer using a polymer electrolyte or a solid electrolyte.

FIGS. 2*a* to 2*d* are cross-sectional view illustrating a cap assembly 140 of a cylindrical secondary battery 100 according to Comparative Example and Embodiment of the present invention. FIG. 3 is a table summarizing whether the cap assembly 140 of the cylindrical secondary battery 100 is deformed according to Embodiment and Comparative Example of the present invention. Here, FIG. 2*a* corresponds to Comparative Example 1 of FIG. 3, FIG. 2*b* corresponds to Comparative Example 2 of FIG. 3, FIG. 2*c* corresponds to Embodiment 2 of FIG. 3, and FIG. 2*d* corresponds to Embodiment 3 of FIG. 3.

As illustrated in FIGS. 2*a* to 2*d*, the cap assembly 140 may include a cap-up 141, a safety vent 142 disposed under the cap-up 141, a connection ring disposed below the safety vent 142, and a cap-down disposed below the connection ring 143. In some examples, a mutual contact (connection) ratio between the safety vent 142 and the cap-down 144 may range of approximately 60% and approximately 100%.

In some examples, the cap-up 141 may include a cap-up contact part 141*b* that is in contact with the safety vent 142, a cap-up inclined part 141*c* inclined upward from the cap-up contact part 141*b* and having a plurality of through-holes 141*a*, and a cap-up ceiling part 141*d* extending in parallel from the cap-up inclined part 141*c*. In some examples, an external device may be electrically connected to the cap-up ceiling part 141*d*.

In some examples, the safety vent 142 may include a vent contact part 142*a* that is in contact with the cap-up contact part 141*b* of the cap-up 141, a vent inclined part 142*b* inclined downward from the vent contact part 142*a*, a vent bottom part 142*c* extending in parallel from the vent inclined part 142*b*, and a vent protrusion 142*d* protruding from the vent bottom part 142*c* so as to be in contact (connected) with the cap-down 144.

In some examples, a diameter (length or width) of the vent protrusion 142*d* may range of approximately 60% and approximately 100% of a diameter (length or width) of the vent bottom part 142*c*. In some examples, the vent protrusion 142*d* may be welded to the cap-down 144 by laser or ultrasonic waves, and thus, the vent protrusion 142*d* and the cap-down 144 may be in contact (connected) with each other.

In some examples, the vent contact part 142*a* may be bent multiple times to be in contact with each of bottom, side, and top surfaces of the cap-up contact part 141*b*. In some examples, the vent bottom part 142*c* may further include a substantially flat vent groove part 142*e* formed in a top surface thereof facing the vent protrusion 142*d*. In some examples, the flat vent groove part 142*e* may be formed by pressing a mold for forming the vent protrusion 142*d* in the vent bottom part 142*c*. In some examples, the vent bottom part 142*c* of the safety vent 142 may further include a substantially line-shaped vent groove 142*f* formed in a top surface facing the vent protrusion 142*d*. In some examples, the line-shaped vent groove 142*f* may be ruptured when a pressure inside the battery is higher than a preset pressure to discharge the internal gas to the outside.

In some examples, the cap-down 144 may include a cap-down contact part 144*b* that is in contact with the connection ring 143, a cap-down inclined part 144*c* that is inclined downward from the cap-down contact part 144*b*, and a cap-down bottom part 144*d* extending in parallel from the cap-down inclined part 144*c*. In some examples, the connection ring 143 may be interposed between the vent contact part 142*a* and the cap-down contact part 144*b*. In some examples, each of the cap-up 141, the safety vent 142, and the cap-down 144 may include a metal material (e.g., copper, nickel, or aluminum), but the connection ring 143 may include an insulating material (e.g., polypropylene or polyethylene).

In some examples, the cap-down bottom part 144*d* may further include a through-hole 144*a* passing through the cap-down bottom part 144*d*. In some examples, the vent protrusion 142*d* may cover a portion of the through-hole 144*a* (see FIG. 2*d*). In some examples, the cap-down 144 may further include a flat cap-down groove part 144*e* formed in a bottom surface. Here, a diameter (length or width) of the vent protrusion 142*d* may be greater than a diameter (length or width) of the flat cap-down groove part 144*e*. In some examples, the negative tab 125 (see FIG. 1*b*) may be welded to the cap-down bottom part 144*d* that is outside of the flat cap-down groove part 144*e*.

For example, in FIG. 2*a* (Comparative Example 1), the diameter (length) of the vent bottom part 142*c* may be approximately 11.04 mm, and the diameter (length) of the vent protruding portion 142*d* may be approximately 3.28 mm. Thus, a mutual contact length (diameter) between the vent bottom part 142*c* and the cap-down bottom part 144*d* may be approximately 3.28 mm, and a mutual contact (connection) ratio may be approximately 29.7%.

For example, in FIG. 2*b* (Comparative Example 2), the diameter (length) of the vent bottom part 142*c* may be approximately 11.04 mm, and the diameter (length) of the vent protruding portion 142*d* may be approximately 4.5 mm. Thus, a mutual contact length (diameter) between the vent bottom part 142*c* and the cap-down bottom part 144*d* may be approximately 4.5 mm, and a mutual contact (connection) ratio may be approximately 40.8%.

For example, in FIG. 2*c* (Embodiment 2), the diameter (length) of the vent bottom part 142*c* may be approximately 11.04 mm, and the diameter (length) of the vent protruding portion 142*d* may be approximately 7.5 mm. Thus, a mutual contact length (diameter) between the vent bottom part 142*c* and the cap-down bottom part 144*d* may be approximately 7.5 mm, and a mutual contact (connection) ratio may be approximately 67.9%.

For example, in FIG. 2*d* (Embodiment 3), the diameter (length) of the vent bottom part 142*c* may be approximately 11.04 mm, and the diameter (length) of the vent protruding portion 142*d* may be approximately 9.6 mm. Thus, a mutual contact length (diameter) between the vent bottom part 142*c* and the cap-down bottom part 144*d* may be approximately 9.6 mm, and a mutual contact (connection) ratio may be approximately 87.0%.

As illustrated in FIG. 3, when a usage amount (contact amount) of the cap-down bottom part 144*d* relative to the vent bottom part 142*c* (or an amount of use of the vent bottom part 142*c* relative to the cap-down bottom part 144*d*) is less than approximately 60% (i.e., Comparative Example 1 to 5), deformation was found in the cap assembly 140 after beading and crimping processes of the secondary battery 100.

However, when the usage amount (contact amount) of the cap-down bottom part 144*d* relative to the vent bottom part 142*c* (or the amount of use of the vent bottom part 142*c* relative to the cap-down bottom part 144*d*) is approximately 60% to 100% (i.e., Embodiments 1 to 4), the deformation was not found in the cap assembly 140 after the beading and crimping processes of the secondary battery 100.

In FIG. 3, a length (mm) of the vent bottom part may include a diameter of the vent bottom part 142*c*, and a contact length (mm) may include a contact diameter between the vent protrusion 142*d* and the cap-down bottom part 144*d*. In addition, the usage amount (%) may include a ratio of the contact length between the vent protrusion 142*d* and the cap-down bottom part 144*d* to the length of the vent bottom part 142*c*.

In some examples, as illustrated in FIG. 3, the length of the vent bottom part 142*c* may be approximately 11.04 mm, and the contact length, that is, the lengths of the vent protrusion 142*d* may be 3.28 mm, 4.5 mm, 5.5 mm, 6.0 mm, 6.5 mm in Comparative Examples 1 to 5, respectively, and may be 7.0 mm, 7.5 mm, 9.6 mm, and 11.0 mm in Embodiments 1 to 4, respectively. In addition, the usage amounts may be 29.7%, 40.08%, 49.8%, 54.3%, and 58.9% in Comparative Examples 1 to 5, respectively, and may be 63.7%, 67.9%, 87.0%, and 100.0% in Embodiments 1 to 4, respectively.

As illustrated in FIG. 3, in Comparative Examples 1 to 5, the deformation occurred in the cap assembly during the battery manufacturing process, and in Embodiments 1 to 4, the deformation did not occur in the cap assembly during the battery manufacturing process. Therefore, the mutual contact ratio between the safety vent and the cap-down may be preferably 60% to 100%.

In this manner, the embodiments of the present invention may provide the cylindrical secondary battery 100 capable of preventing the deformation of the cap assembly 140 during the manufacturing process or during the use. In some examples, the mutual contact ratio between the safety vent 142 and the cap-down 144 may range of approximately 40% and approximately 100% relative to the area of the vent bottom part 142*c* to prevent the deformation of the cap assembly 140 during the manufacturing process or during the use, thereby providing the secondary battery, in which the sealing performance is not deteriorated, and the overall height thereof is not changed.

The above-mentioned embodiment is merely an embodiment, and thus, the present invention is not limited to the foregoing embodiment, and also it will be understood by those of ordinary skill in the art that various changes in form and details may be made therein without departing from the spirit and scope of the present invention as defined by the following claims.

The invention claimed is:

1. A cylindrical secondary battery comprising:

a cylindrical can;

an electrode assembly accommodated in the cylindrical can; and a cap assembly configured to cover the cylindrical can so as to seal the electrode assembly, wherein the cap assembly comprises a cap-up, a cap-down below the cap-up, and a safety vent between the cap-up and the cap-down, wherein a mutual contact ratio between the safety vent and the cap-down ranges from 60% to 100%, wherein the safety vent comprises a vent protrusion having a lower surface protruding toward the cap-down, wherein the cap-down comprises a cap-down bottom part having an upper surface to which the vent protrusion is welded, and wherein the mutual contact ratio is defined based on an area of the lower surface of the vent protrusion rather than an area of the upper surface of the cap-down bottom part.

2. The cylindrical secondary battery of claim 1, wherein the safety vent comprises:

a vent contact part that is in contact with the cap-up;

a vent inclined part inclined downward from the vent contact part;

a vent bottom part extending in parallel from the vent inclined part; and the vent protrusion protruding from the vent bottom part so as to be in contact with the cap-down.

3. The cylindrical secondary battery of claim 1, wherein a vent bottom part further comprises a flat vent groove part formed in a top surface thereof facing the vent protrusion.

4. The cylindrical secondary battery of claim 1, wherein a vent bottom part further comprises a line-shaped vent groove part formed in a top surface thereof facing the vent protrusion.

5. The cylindrical secondary battery of claim 1, wherein the cap-down further comprises a flat cap-down groove part formed in a bottom surface thereof, and a diameter of the vent protrusion is greater than a diameter of the flat cap-down groove part.

6. The cylindrical secondary battery of claim 1, wherein when the mutual contact ratio between the safety vent and the cap-down is less than 60%, deformation of the cap assembly occurs after a beading or crimping process, and when the mutual contact ratio is within the range of 60% to 100%, no deformation of the cap assembly occurs after the beading or crimping process.

7. The cylindrical secondary battery of claim 3, wherein the flat vent groove part is configured to increase a planar contact area between the vent bottom part and the cap-down so as to maintain the mutual contact ratio of 60% to 100%.

8. The cylindrical secondary battery of claim 1, wherein a welded region between the vent protrusion and the cap-down is configured to maintain uniform planar contact between the safety vent and the cap-down during a beading or crimping process.

* * * * *